United States Patent [19]
Wilson

[11] Patent Number: 5,388,005
[45] Date of Patent: Feb. 7, 1995

[54] ELECTRICALLY-ADJUSTABLE VARIABLE POWER RIFLE TELESCOPE

[76] Inventor: Steven W. Wilson, 4767 Lakeside Blvd., Hale, Mich. 48739

[21] Appl. No.: 980,990

[22] Filed: Nov. 24, 1992

[51] Int. Cl.$^6$ .................. G02B 15/14; G02B 23/00; F41G 1/38
[52] U.S. Cl. .................... 359/694; 359/422; 33/246; 42/101
[58] Field of Search .......... 359/299, 402, 403–407, 359/410–423, 425, 426, 429, 432, 694, 696, 698, 703, 819, 822, 825, 830; 356/150–151, 153, 250–253; 33/332–334, 50, 53, 241, 244–250; 42/100, 101

[56] References Cited

U.S. PATENT DOCUMENTS

| | | | |
|---|---|---|---|
| 4,021,954 | 5/1977 | Crawford | 33/250 |
| 4,873,779 | 10/1989 | Ellison et al. | 33/245 |
| 4,952,041 | 8/1990 | Sandall | 359/422 |
| 5,180,875 | 1/1993 | Berry, Jr. et al. | 42/101 |
| 5,194,987 | 3/1993 | Moore et al. | 359/422 |
| 5,276,554 | 1/1994 | Nassivera | 33/246 |

*Primary Examiner*—Loha Ben
*Assistant Examiner*—Thong Nguyen
*Attorney, Agent, or Firm*—Remy J. VanOphem; John VanOphem

[57] ABSTRACT

A variable power telescope with an automatic adjustment feature which enables the user of a firearm to automatically and quickly adjust the magnification power of the telescope while maintaining a secure grasp on the firearm with both hands and without losing the target viewed through the telescope. The magnification of the telescope is controlled through a battery-powered motor which can be operated by a switch near the trigger hand, allowing control with one finger on the user's trigger hand. The telescope also prevents operation of the motor beyond the adjustment range of the telescope by providing a shut-off switch that serves as a limit switch at the operational extremes of the telescope.

13 Claims, 1 Drawing Sheet

ELECTRICALLY-ADJUSTABLE VARIABLE POWER RIFLE TELESCOPE

BACKGROUND OF THE INVENTION

1. Field of the Invention

The present invention generally relates to telescopes used with firearms. More specifically, this invention relates to a variable power telescope which is electrically adjustable so as to permit the shooter to selectively increase and decrease the magnification of the telescope without requiring the shooter to alter his or her grip on the firearm.

2. Description of the Prior Art

Telescopes are often attached to firearms, most often hunting and target rifles, to improve the accuracy of the user's aim. Variable power telescopes with "zoom" capability are also known, and permit the user to adjust the magnification of the target to suit the particular needs of the user and the occasion. For example, as the distance between the target and the user increases, it is generally desirable to increase the magnification power of the telescope. In addition, when the type of background behind the target makes initially sighting the target difficult, the user will often decrease the magnification to increase the field of vision through the telescope. Once the target is in view, the telescope can be zoomed to magnify the image of the target to a suitable level.

A conventional optical system for a telescope generally includes a pair of lenses which alter the magnification of the image seen by the user as the lenses are moved relative to each other along an axis corresponding to the user's line of sight through the telescope. Adjustment of the telescope's magnification is made with an adjustment ring or wheel located near the rear of the telescope. The adjustment ring typically controls an adjustment mechanism which includes a camming feature that, when rotated, causes the rear lens to move toward or away from the front lens, so as to increase or decrease the magnification of the target image.

While such variable powered telescopes are widely used, they have a significant drawback in that it is rather inconvenient to rotate the adjustment ring to adjust the magnification of the telescope. Generally, the user must take one hand from the gun in order to adjust the magnification. To do this safely, the user must typically lower the firearm, rotate the adjustment ring, and then again raise the firearm to locate the target through the telescope. In doing so, the user will have lost sight of the target, and consequently must again find the target under increased magnification which, as noted before, is more difficult in that the telescope now provides a smaller field of vision. If the user attempts to maintain the firearm on its target during adjustment, he or she is confronted with holding a firearm often weighing ten pounds or more with only one hand while turning the adjustment ring with the other. Not only is such a maneuver difficult, particularly when trying to keep sight of the target, but it can also be quite dangerous.

Accordingly, what is needed is a device which can be mounted to a telescope for providing an adjustment capability which alleviates the need for the user to support the firearm with one hand while making the adjustment, while also permitting the user to maintain his or her sight through the telescope on the target while the adjustment is made.

SUMMARY OF THE INVENTION

According to the present invention there is provided an automatic variable power telescope and, more particularly, an electrically-powered adjustment device for increasing and decreasing the magnification of the variable power telescope. The adjustment device can be mounted directly to the telescope of a firearm, such as a rifle, in a manner that permits the user of the firearm to control the magnification power of the telescope with a single finger while maintaining a firm grasp of the firearm, while also allowing the user to keep the target in the sights of the telescope.

In a generally conventional manner, the telescope includes a series of lenses which magnify the image of a target from the perspective of the firearm's user as the user looks through the telescope. As is also conventional, a device is provided which alters the relative longitudinal positions of the lenses within the telescope to provide selective control of the magnification produced by the lenses. Such a device can be an adjustment ring mounted on the telescope which can be rotated to move one of the lenses. An electrically-powered device, such as an electric motor, is mounted on the telescope for selectively rotating the adjustment ring in both a forward and reverse direction which corresponds to increasing and decreasing the magnification power of the telescope. The user operates the electric motor with a switch mounted near the trigger hand, permitting the user to control the magnification of the target with his or her trigger hand. As such, the adjustment device of this invention does not require the user to alter his or her grip on the firearm, and enables the user to keep the target in the telescope's sights while the adjustment is being made.

In a preferred embodiment, the electric motor is provided with a renewable power source, such as a battery. Also in the preferred embodiment, the operation range of the electric motor is kept within that of the magnification of the telescope by a limiting switch, such that power to the electric motor will be automatically interrupted once the maximum or minimum magnification capability of the telescope is reached.

According to a preferred aspect of this invention, the electric motor, its power source, and the adjustment ring are all mounted to the telescope to promote the ease with which the rifle and telescope can be handled. Furthermore, the switch by which the electric motor is controlled is located near the trigger hand to permit the user to easily adjust the magnification of the telescope at any time, including while the user has the target in the sights of the telescope. This latter capability is particularly advantageous in that the user can reduce the magnification of the telescope to more quickly sight the target through the telescope, and then later increase the magnification to improve the accuracy of his or her aim.

In addition, a significant advantage of the present invention is that the user can also make adjustments in a safe manner without having to move one hand from the firearm to the adjustment ring. Such a feature is particularly advantageous to gun enthusiasts and hunters who have a physical impairment that makes handling and supporting the firearm difficult.

Another significant advantage of the present invention is that all of the components can be fitted to a conventional telescope. Adjustment rings which are conventional with typical variable power telescopes need only be modified or replaced with an adjustment ring which can be driven by an electric motor. Accordingly, only minor tooling changes are necessary for telescope manufacturers to incorporate the adjustment capability of this invention.

Accordingly, it is an object of the present invention to provide a self-powered adjustment device for increasing and decreasing the magnification of a variable power telescope.

It is a further object of the invention that the adjustment device be controlled in a manner that permits the firearm's user to safely support the firearm with both hands as the adjustment is being made.

It is still a further object of the invention that the adjustment device permit the firearm's user to maintain a target in the sights of the telescope as the adjustment is made to enable the user to find the target under minimum magnification, then increase magnification to improve the accuracy of aim.

It is another object of the invention that the adjustment device include a limiting switch that interrupts power to the adjustment device once minimum or maximum magnification has been achieved.

Other objects and advantages of this invention will be more apparent after a reading of the following detailed description taken in conjunction with the drawings provided.

DETAILED DESCRIPTION OF THE PREFERRED EMBODIMENT

Figure 1:
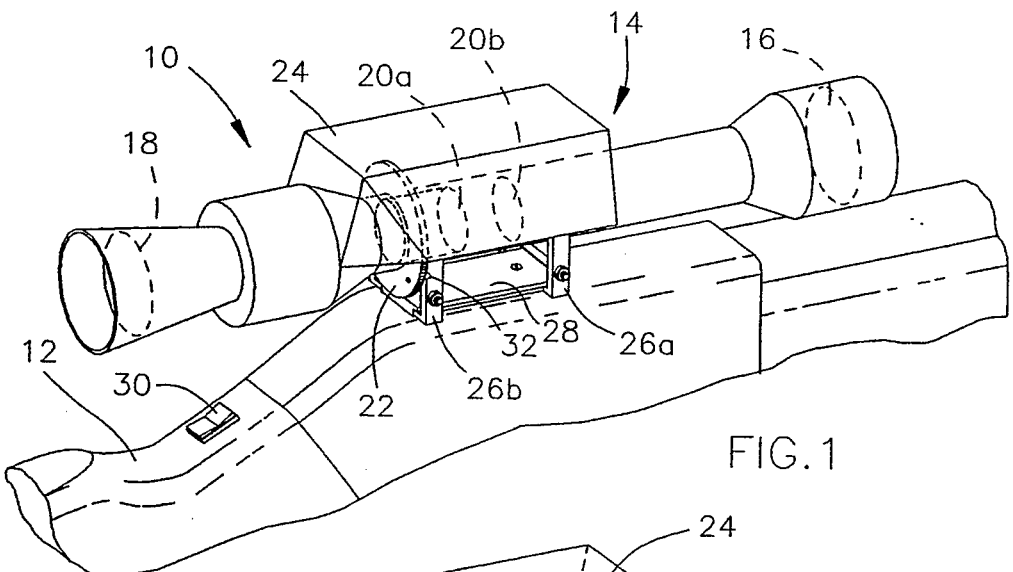
FIG. 1 is a perspective partially cut away view of a rifle equipped with an automatic telescoping rifle scope in accordance with a preferred embodiment of this invention.

With reference to FIG. 1, there is shown a rifle and scope assembly 10 consisting of a rifle 12 and a variable power telescope 14 constructed in accordance with this invention. The telescope 14 is shown as being mounted to the rifle 12 using conventional mourning clamps 26a and 26b which are secured to a rail 28 attached to an upper surface of the rifle 12. A conventional optical system for a telescope is also schematically depicted, and is composed of an objective lens 16, an ocular lens 18, and a pair of erecting lenses 20a and 20b. The functions of such lenses 16, 18, 20a, and 20b are well known to those skilled in the art, and will not be described in detail here. However, for purposes of understanding the present invention, it should be understood that the erecting lenses 20a and 20b serve to both reinvert the image from the objective lens 16 and, more importantly here, to alter the magnification of the image seen by the user, i.e., to decrease or increase the degree of target image magnification. In a conventional manner, this may be done by mounting the rear erecting lens 20a within an adjustment mechanism (not shown) having a camming feature which, when rotated, causes the rear erecting lens 20a to move longitudinally toward or away from the front erecting lens 20b, so as to increase or decrease the magnification of the target image. Though such a construction is typical in the prior art, it is within the scope of this invention to encompass not only the adjustment mechanism described above, which converts a rotational input to a translational output, but all adjustment mechanisms which produce a translational output at the rear erecting lens 20a.

To provide the preferred rotational input to the adjustment mechanism, an adjustment ring 22 is typically mounted toward the rear end of the telescope 14. The adjustment ring 22 is conventional in that it projects from the periphery of the telescope 14 to be readily accessible to the user of the rifle 12. According to the present invention, the adjustment ring 22 is unconventional in that it has gear teeth 48 formed at its periphery and a pair of switching pins 32 projecting from its front surface. The adjustment ring 22 is preferably formed from a lightweight, wear resistant material, such as nylon. As shown, the adjustment ring 22 projects sufficiently from beneath a cover 24 to allow it to be manually rotated when necessary.

Figure 2:
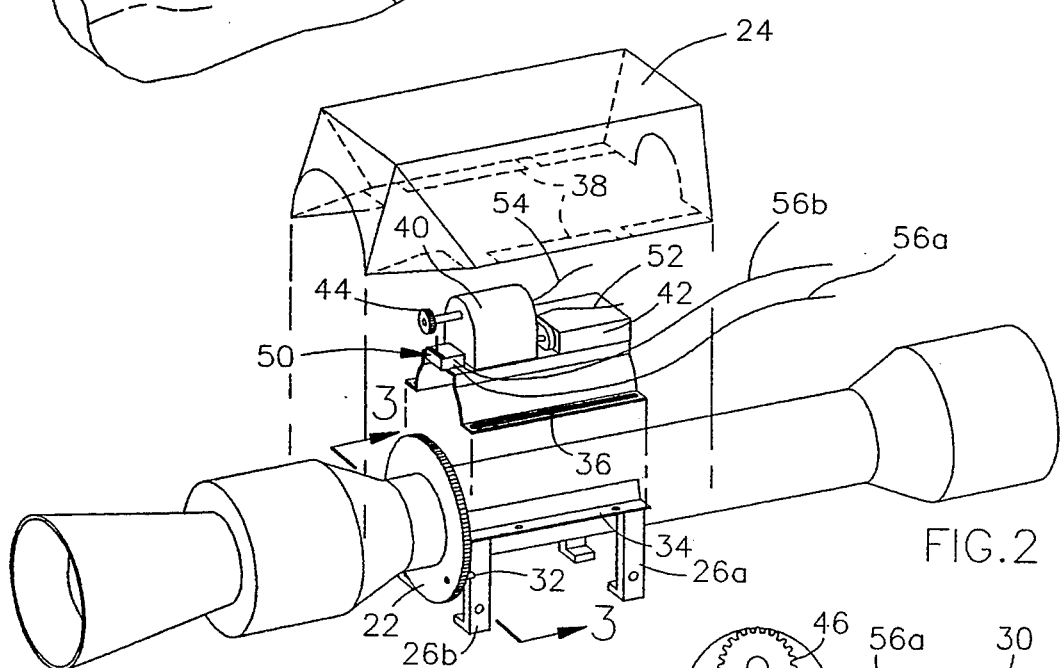
FIG. 2 is an exploded view of the automatic telescoping rifle scope of FIG. 1.

In accordance with the present invention, the adjustment ring 22 is intended to be rotated by an electric motor 40 mounted on a platform 36 through a gear reduction system, as best seen in FIG. 2. The electric motor 40 includes a pinion 44 whose teeth 46 mesh with the gear teeth 48 of the adjustment ring 22, as indicated, such that the adjustment ring 22 will cause longitudinal movement of the rear erecting lens 20a upon energizing the electric motor 40. Similar to the adjustment ring 22, the pinion 44 is preferably formed from a lightweight, wear resistant material, such as nylon.

The electric motor 40 is preferably powered by an appropriately sized battery 42 which is also mounted on the platform 36. To achieve sufficient torque to rotate the adjustment ring 22, it is generally preferable that the electric motor 40 be capable of generating about 5 inch-pounds of torque at speeds of less than about 50 rpms, though these parameters will vary according to the particular requirements of the telescope 14. Generally, the battery 42 must be sized to provide adequate current for the electric motor 40, and such determinations are well within the knowledge of one skilled in the art. It is foreseeable that a wide variety of electric motor and battery combinations would be suitable for accomplishing the teachings of this invention.

As shown, the platform 36 is preferably secured in any conventional manner to a pair of flanges 34, one of which projects laterally from each side of the telescope 14. To protect the electric motor 40 and battery 42, the cover 24 is provided which also is secured to the flanges 34 projecting from the telescope 14. To promote ready access to the electric motor 40 and battery 42, the cover 24 can be tensionally secured to the flanges 34 by providing a slight interference between the flanges 34 and a pair of inwardly-extending flanges 38 at the lower edges of the cover 24. Alternatively, the cover 24 can be secured to the flanges 34 with screws (not shown) or by any other suitable device. In this alternative embodiment, it would be preferable to provide an access door to the battery 42. Preferably, the cover 24 is also provided with an insulating layer (not shown) to suppress the noise generated by the electric motor 40.

Figures 3, 4:
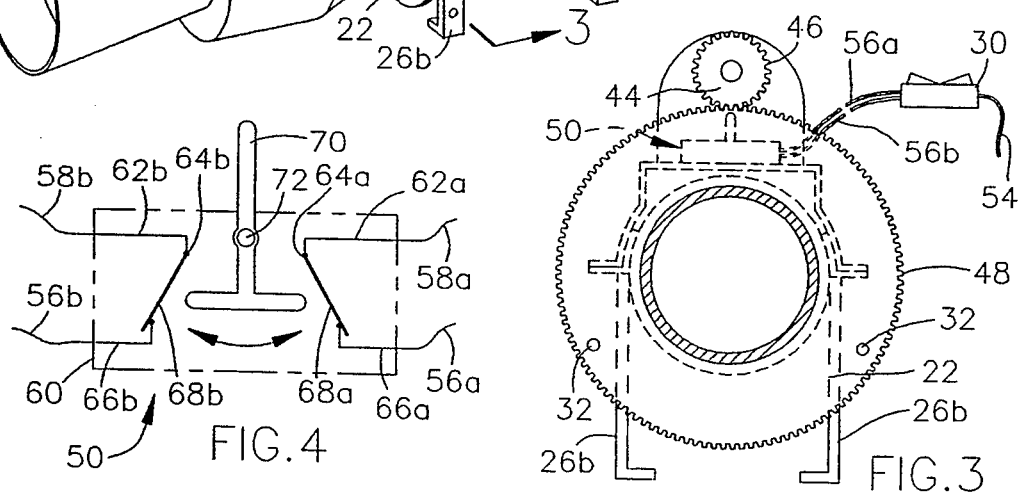
FIG. 3 is a rear view of the automatic telescoping rifle scope taken along line 3—3 of FIG. 2.
FIG. 4 is an enlarged rear sectional view of a shut-off switch shown in FIG. 3 in accordance with the preferred embodiment of this invention.

As shown in FIGS. 1 and 3, the operation of the electric motor 40 is preferably controlled by a hand operated switch, such as the rocker switch 30 shown. Generally, the rocker switch 30 is pivotable about a central axis oriented parallel to its upper surface, such that the rocker switch 30 can be pivoted by pressing either end of the rocker switch 30. The rocker switch 30 is preferred in that it permits full control of the electric motor 40 with a single finger of the user. As seen in FIG. 1, the rocker switch 30 is preferably located on the stock of the rifle 12 in the general vicinity in which the thumb of the user's trigger hand would rest while the rifle 12 is aimed. As a result, the magnifying power of the telescope 14 can be varied with only the use of the user's thumb, all while the user is aiming the rifle 12. However, it is foreseeable that the rocker switch 30 could be located in various other locations on the rifle 12. Further discussion of the operation of the rocker switch 30 will not be provided here, in that rocker switches having the above capabilities are well known in the relevant art.

When appropriately wired, the electrical polarity from the battery 42 to the electric motor 40 can be provided to drive the electric motor 40 in one rotational direction by pressing one end of the rocker switch 30. By pressing the opposite end of the rocker switch 30, the electric motor 40 will be driven in the opposite rotational direction. Correspondingly, magnification or reduction in the target image can be achieved by operating the rocker switch 30 in this manner.

To provide the above capability, the preferred wiring scheme is as follows. The battery 42 is provided with a ground lead 52 and a positive lead 54 which is routed to the rocker switch 30. As shown in FIG. 3, there are two positive leads 56a and 56b leaving the rocker switch 30. The first positive lead 56a is routed through a shut-off switch 50 to one terminal post (not shown) of the electric motor 40, while the second positive lead 56b is electrically connected through the shut-off switch 50 to a second terminal post (not shown) of the electric motor 40. In a conventional manner, switching current flow from one terminal post to the other reverses the polarity of the electric motor 40, and thus permits bi-directional operation of the electric motor 40, as described above.

The shut-off switch 50 enables the electric motor 40 to be automatically shut off once the rear erecting lens 20a has reached its minimum or maximum positions within the telescope 14 (corresponding to the minimum and maximum magnification capability of the telescope 14). As shown in FIG. 4, the positive leads 56a and 56b from the rocker switch 30 are routed into the shut-off switch 50. From the shut-off switch 50, a corresponding pair of positive leads 58a and 58b are routed to the electric motor 40.

The shut-off switch 50 includes a housing 60 which is preferably made of a dielectric material, such as a suitable plastic. As shown in FIG. 4, the positive leads 56a and 56b from the rocker switch 30 enter the housing 60 from opposite sides, and each contacts a corresponding lower post 66a and 66b. Paralleling the positive leads 56a and 56b and their lower posts 66a and 66b are the positive leads 58a and 58b, routed to the electric motor 40, and a corresponding pair of upper posts 62a and 62b. The upper posts 62a and 62b are provided with joints 64a and 64b, from which extend a corresponding pair of cantilevered contacts 68a and 68b. The cantilevered contacts 68a and 68b are biased to contact the lower posts 66a and 66b, as shown. To promote a reliable contact between the cantilevered contacts 68a and 68b and the lower posts 66a and 66b, the joints 64a and 64b can be formed as either a sharp bend in the upper posts 62a and 62b, or by any other suitable structure, such as a spring-biased hinge.

A switch arm 70 extends out of the housing 60 through an upper wall of the housing 60. The housing 60 is positioned on the platform 36 such that the upper end of the switch arm 70 is located roughly the same distance from the center of rotation of the adjustment ring 22 as are the switching pins 32, as best seen in FIG. 3. The switch arm 70 is pivotable about an axis 72 defined by a pin or any other suitable structure projecting from the front or rear wall of the housing 60, and is preferably biased to be in a vertical "null" position. At the lower end of the switch arm 70 are two oppositely projecting lateral extensions which are adapted to strike the cantilevered contacts 68a and 68b when pivoted about its axis 72. As a result, the switch arm 70 is capable of breaking contact between one or the other cantilevered contacts 68a or 68b with its corresponding lower post 66a or 66b, and thereby interrupting continuity of the circuit between the battery 42 and the electric motor 40.

The switch arm 70 projects from the housing 60 to permit the switching pins 32 on the adjustment ring 22 to actuate the switch arm 70. As best seen in FIG. 3, the included angle between the switching pins 32 is roughly 120 degrees apart to permit an equivalent amount of rotation for the adjustment ring 22 without one of the switching pins 32 contacting the switch arm 70. In effect, the adjustment ring 22 is rotated from one switching pin 32 to the other to control the amount of magnification provided by the telescope 14. Further rotation in either direction is prevented by the act of the appropriate switching pin 32 breaking continuity between the battery 42 and the electric motor 40.

In operation, the user holds the rifle 12 in the conventional manner and sights a target through the telescope 14. Generally, the user will initially reduce the magnification of the telescope 14 to a minimum by using the rocker switch 30 to run the rear erecting lens 20a to its position nearest the front erecting lens 20b. Doing so provides the user with the largest field of view, enabling the user to more quickly sight the target through the telescope 14. Afterwards, the user can press the rocker switch 30 in a manner that corresponds to energizing the electric motor 40 to rotate in a direction that increases the distance between the rear and front erecting lenses 20a and 20b, so as to increase the magnification of the target as seen by the user through the telescope 14. The above can be accomplished all while the user maintains his or her sight on the target and while the rifle 12 is safely and securely supported by both hands.

To quickly attain maximum or minimum magnification, the user can simply press the rocker switch 30 to energize the electric motor 40 until one of the switching pins 32 contacts the switch arm 70 to break contact between the corresponding cantilevered contact 68a or 68b and the corresponding lower post 66a or 66b. As a result, the electric motor 40 will be automatically de-energized, preventing an accidental stall of the electric motor 40, which may otherwise shorten the life of the electric motor 40.

From the above, it can be seen that a significant advantage of the telescope 14 of the present invention is that by selectively energizing the electric motor 40, the magnification power of the telescope 14 can be automatically adjusted to suit the needs of the user, all while permitting the user to maintain his or her grip on the rifle 12 and while keeping the selected target in sight through the telescope 14. Consequently, not only can the user quickly adjust the power of the telescope 14 to produce the desired magnification of the target, but the user can also do so in a safe manner without shifting hands to manually adjust the adjustment ring 22. Adjustments in magnification power can also be made without lowering or setting the rifle 12 down, which would result in the user losing sight of the target. Such features are particularly advantageous to target shooters and hunters who have a physical impairment which makes handling and supporting the rifle 12 difficult.

In addition, the uncomplicated manner in which the telescope 14 is assembled and operates provides a generally low cost unit. The battery-powered electric motor 40 provides smooth, efficient and relatively quiet operation, while also permitting the user to operate the adjustment ring 22 manually in case of battery failure.

Another significant advantage of the present invention is that the components described above for achieving the automatic operation of the telescope 14 can be fitted to conventional telescopes. The platform 36 can be readily adapted to fit telescopes of various sizes, while the adjustment ring 22 can generally be substituted for conventional adjustment rings currently provided with variable power telescopes. Accordingly, only minor tooling changes are necessary for telescope manufacturers to incorporate the electrically powered adjustment capability of this invention.

Accordingly, the present invention provides a variable power telescope with an automatic adjustment feature which enables the user of a firearm to automatically and quickly adjust the magnification power of the telescope while maintaining a secure grasp on the firearm with both hands and while keeping the target sighted through the telescope. The magnification of the telescope is controlled by operating a switch near the trigger hand, allowing control with one finger of the user's trigger hand. The telescope also prevents operation of the motor beyond the adjustment range of the telescope by providing a shut-off switch that serves as a limit switch at the operational extremes of the telescope.

While the invention has been described in terms of a preferred embodiment, it is apparent that other forms could be adopted by one skilled in the art. For example, the manner in which the erecting lenses 20a and 20b are repositioned relative to each other could be accomplished in other ways, such as with a rack driven by the pinion 44. Also, as should be appreciated by one skilled in the art it is possible to replace the drive means with either a belt and pulley arrangement or a friction-type drive means for altering the magnification produced by the telescope 14 without departing from the scope of the invention. Additionally, other switching devices for controlling the electric motor 40 could be readily adopted by those skilled in the art to achieve the adjustment control described. Accordingly, the scope of the invention is to be limited only by the following claims.

What is claimed is:

1. An adjustment device for a telescope mounted on a firearm, said adjustment device comprising:
   a mounting rail attached to an upper surface of said firearm;
   a pair of mounting clamps having one end mounted to said mounting rail and an opposite end extending in a direction away from said firearm;
   a variable power telescope having a pair of flanges attached thereto and laterally projecting therefrom, said pair of flanges being removably attached to said pair of mounting clamps, said variable power telescope further comprising:
      an adjustment ring externally mounted thereto adjacent one end of said pair of flanges; and
      magnifying means mounted to said variable power telescope for providing a magnified image of a target to a user of said firearm;
   a platform support member having a pair of flanges thereon, each one of said pair of flanges being mounted to a respective one of said pair of mounting clamps;
   drive means juxtaposed said adjustment ring, said drive means further being mounted to said platform support member and complementary with said adjustment ring for altering the magnification produced by said magnifying means; and
   selective control means mounted to said firearm and connected to said drive means for selectively controlling the magnification produced by said magnifying means;
   whereby while the user holds said firearm with both arms and sights a target through said magnifying means said user adjusts said magnifying means with said selective control means to vary the magnification of said target as seen by said user when sighting through said telescope.

2. The adjustment device of claim 1 wherein said magnifying means comprises:
   a plurality of lenses; and
   means for displacing at least one lens of said plurality of lenses relative to another, lens of said plurality of lenses.

3. The adjustment device of claim 2 wherein said adjustment ring is rotatably mounted to said telescope and in mechanical communication with said at least one lens.

4. The adjustment device of claim 1 wherein said drive means comprises:
   a power source;
   a motor electrically connected to said power source so as to be selectively powered by said power source; and
   mechanical drive means in communication with said motor and said magnifying means for adjusting said magnifying means so as to increase and decrease the magnification of said magnified image.

5. The adjustment device of claim 4 wherein said power source comprises a battery.

6. The adjustment device of claim 4 wherein said motor comprises an electric motor.

7. The adjustment device of claim 4 wherein said mechanical drive means comprises a gear reduction system.

8. The adjustment device of claim 1 wherein said drive means comprises limiting means for de-energizing said drive means at minimum and maximum extremes of magnification of said magnifying means.

9. An adjustment device for a variable power telescope mounted on a firearm, said adjustment device comprising:
   a mounting rail attached to an upper surface of said firearm;
   means for mounting said mounting rail to said firearm;
   a pair of mounting clamps having one end mounted to said mounting rail and an opposite end extending in a direction away from said firearm and adapted to receive said variable power telescope;
   a plurality of lenses mounted to said variable power telescope for providing a magnified image to a user of said firearm;

a platform support member having a pair of flanges thereon, each one of said pair of flanges being mounted to a respective one of said pair of mounting clamps such that said platform support member surrounds said variable power telescope located within said pair of mounting clamps;

means for displacing at least one lens of said plurality of lenses relative to another lens of said plurality of lenses, said displacement means adjusting the magnification power of said plurality of lenses so as to increase and decrease said magnified image;

a power source mounted to said platform support member;

a motor mounted to said platform support member adjacent said power source, said motor being electrically connected to said power source so as to be selectively powered by said power source;

mechanical drive means mounted to said platform support member having one end communicating with said motor and another end communicating with said displacement means;

means electrically connected to said motor for selectively controlling the operation of said displacement means so as to provide selective control of the magnification produced by said plurality of lenses; and limiting means for de-energizing said motor at minimum and maximum extremes of magnification of said plurality of lenses whereby while a user holds said firearm with both arms and sights a target through said plurality of lenses said user operates said displacement means with said selective control means to vary the magnification of said magnified image as seen by said user when sighting through said variable power telescope.

10. The adjustment device claim 9 wherein said displacing means is rotatably mounted to said telescope and in communication with at least one lens of said plurality of lenses for displacing said at least one lens relative to another lens of said plurality of lenses.

11. The adjustment device of claim 9 wherein said power source comprises a battery.

12. The adjustment device of claim 9 wherein said motor comprises an electric motor.

13. The adjustment device of claim 9 wherein said mechanical drive means comprises a pinion meshed with said displacement means.

* * * * *

UNITED STATES PATENT AND TRADEMARK OFFICE
CERTIFICATE OF CORRECTION

PATENT NO. : 5,388,005
DATED : February 7, 1995
INVENTOR(S) : Steven W. Wilson

It is certified that error appears in the above-indentified patent and that said Letters Patent is hereby corrected as shown below:

```
Column 3, line 47, delete "mourning" insert ---- mounting ----.

Column 8, line 17, delete "the" insert ---- said ----.

Column 8, line 28, delete ---- , ----.

Column 10, line 5, after "lenses" insert ---- ; ----.

Column 10, line 6, after "while" delete "a" and insert ---- said
----.

Column 10, line 13, after "device" insert ---- of ----.

Column 10, line 14, delete "placing" inset ---- placement ----.
```

Signed and Sealed this

Eleventh Day of April, 1995

Attest:

BRUCE LEHMAN

*Attesting Officer*                *Commissioner of Patents and Trademarks*